United States Patent [19]
Asanuma

[11] Patent Number: 5,991,675
[45] Date of Patent: Nov. 23, 1999

[54] VEHICLE CONTROL SYSTEM BASED ON ESTIMATION OF THE DRIVING SKILL OF A VEHICLE OPERATOR

[75] Inventor: Nobuyoshi Asanuma, Saitama-ken, Japan

[73] Assignee: Honda Giken Kogyo Kabushiki Kaisha, Tokyo, Japan

[21] Appl. No.: 08/218,136

[22] Filed: Mar. 25, 1994

[30] Foreign Application Priority Data

Jun. 2, 1993 [JP] Japan .................................. 5-154523

[51] Int. Cl.⁶ .............................. G06F 7/00; G01C 21/00
[52] U.S. Cl. ........................... 701/41; 180/422; 180/444; 701/42; 701/209
[58] Field of Search ........................ 364/424.05, 426.02, 364/449; 180/132, 140, 142, 197

[56] References Cited

U.S. PATENT DOCUMENTS

| | | | |
|---|---|---|---|
| 4,168,499 | 9/1979 | Matsumura et al. | 343/7 VM |
| 4,412,594 | 11/1983 | Furukawa et al. | 180/140 |
| 4,693,332 | 9/1987 | Miyata et al. | 180/142 |
| 4,716,458 | 12/1987 | Heitzman et al. | 358/103 |
| 4,933,857 | 6/1990 | Hashiguchi et al. | 364/426.02 |
| 4,949,268 | 8/1990 | Nishikawa et al. | 364/449 |
| 5,162,997 | 11/1992 | Takahashi | 364/424.05 |
| 5,172,785 | 12/1992 | Takahashi | 180/141 |
| 5,189,619 | 2/1993 | Adachi et al. | 364/426.04 |
| 5,291,962 | 3/1994 | Momiyama et al. | 180/132 |
| 5,301,766 | 4/1994 | Momiyama et al. | 180/197 |

FOREIGN PATENT DOCUMENTS 3217362 9/1991 Japan .
4303007 10/1992 Japan .

*Primary Examiner*—William A. Cuchlinski, Jr.
*Attorney, Agent, or Firm*—Carrier, Blackman & Associates, P.C.; Joseph P. Carrier; William D. Blackman

[57] ABSTRACT

The driving skill of a vehicle operator is determined according to how a driving operation is executed by the vehicle operator. The driving skill can be estimated by comparing an actual trajectory of a vehicle with a ideal or reference vehicle trajectory. The estimated driving skill is used as a control parameter of a vehicle steering system which, for instance, provides a steering property depending on the yaw rate of the vehicle, or provides a reaction opposing a steering input according to the yaw rate of the vehicle. Thus, a skilled vehicle operator will benefit from brisk handling of the vehicle, and can maneuver the vehicle at will, while an unskilled vehicle operator will benefit from stable handling of the vehicle, and will find the vehicle easier to handle and less tiring.

10 Claims, 13 Drawing Sheets

VEHICLE CONTROL SYSTEM BASED ON ESTIMATION OF THE DRIVING SKILL OF A VEHICLE OPERATOR

CROSS REFERENCE TO RELATED APPLICATIONS

The following applications contain subject matters related to this application. The contents of these applications are hereby incorporated in this application by reference.

| Filing Application | | |
|---|---|---|
| date | Number | Title |
| 09/16/93 | 08/122,615 | "Vehicle steering control system" |
| 11/04/93 | 08/147,825 | "Method for controlling a steering system" |

TECHNICAL FIELD

The present invention relates to a system for estimating the driving skill of an operator of a vehicle, and a vehicle control system, in particular a vehicle steering control system, which can optimize its control action according to the driving skill of a vehicle operator.

BACKGROUND OF THE INVENTION

Conventionally, various vehicle control systems have been proposed with the aim of improving the lateral stability of the vehicle and the driveability of the vehicle. Such vehicle control systems include traction control systems and four wheel steering systems. Such vehicle control systems are intended to optimally control the throttle, the brake, the steering system and other parts of the vehicle according to the dynamic properties of the vehicle, the dynamic conditions of the vehicle, and the operations carried out by the vehicle operator.

When the vehicle operator is a skilled one, and is familiar with the dynamic properties of the vehicle, he may not need any assistance from such control systems, and may even find such assistance superfluous and undesirable.

For instance, according to the system proposed in Japanese patent laid-open publication (kokai) No. 3-217362, the skill of the vehicle operator is evaluated according to how quickly a corrective steering action is taken when the vehicle is steered by a difference in the tractions of the right and left wheels against the will of the vehicle operator. It was proposed to permit a certain amount of difference between the tractions of the right and left wheels to exist when the level of the skill of the vehicle operator is relatively high, and control the difference in the tractions of the right and left wheels when the level of the skill of the vehicle operator is relatively low.

According to the invention disclosed in Japanese patent laid open publication (kokai) No. 4-303007, the system estimates what kind of the road, such as a city street, a highway or a country road, the vehicle is travelling from the lateral acceleration, the travelling speed of the vehicle and other parameters, and estimates the skill of the vehicle operator according to the lateral acceleration, the road condition and the steering angle. It is also estimated if the vehicle operator is in a hurry. Depending on the results of such estimation, the system selects a suitable running mode from such modes as a sport mode and a normal mode of the vehicle for the four wheel steering system or other systems of the vehicle so that the driveability of the vehicle may be improved according to such estimated data.

However, according to the proposal of Japanese patent laid-open publication (kokai) No. 3-217362, the skill of the vehicle operator can be evaluated only when the vehicle is steered by a difference in the tractions of the right and left wheels. This situation may not be present most of the time. Furthermore, because the skill of the vehicle operator normally depends on the road condition even for the same vehicle operator, this proposed system would not allow his skill to be constantly evaluated and promptly updated for each new road condition, and the vehicle control system would not be optimized most of the time.

The proposal of Japanese patent laid open publication (kokai) No. 4-303007 also has its shortcomings. Because the driving skill of the vehicle operator estimated from the lateral acceleration, the road conditions and the steering angler are used as control data in a feed-forward system, the control action at each time point is not necessarily optimized. In particular, this system is unsuitable to a situation in which the road condition constantly changes, and the vehicle often encounters unexpected disturbances.

BRIEF SUMMARY OF THE INVENTION

In view of such problems of the prior art, a primary object of the present invention is to provide a control system for a vehicle steering system provided with means for estimating and evaluating the driving skill of a vehicle so that the vehicle steering system may be optimized by taking into account the driving skill of the vehicle operator.

A second object of the present invention is to provide a control system for a vehicle steering system which can maintain the vehicle steering system always in an optimum operating condition according to the driving skill of the vehicle operator.

A third object of the present invention is to provide a system for estimating the driving skill of a vehicle operator which can constantly monitor his skill, and can therefore provide updated data at all times even when his skill depends on road conditions and other variable factors.

A fourth object of the present invention is to provide a control system for a vehicle steering system which can adapt the vehicle to be desirable for both skilled and unskilled vehicle operators.

These and other objects of the present invention can be accomplished by providing a system for estimating a driving skill of a vehicle operator according to an operation executed by the vehicle operator, comprising: means for determining an actual travel trajectory of a vehicle; means for determining a reference travel trajectory according to an operation executed by the vehicle operator; means for integrating a deviation between the reference trajectory and the actual trajectory; and means for comparing a value produced by the integrating means with a prescribed reference value, and evaluating the driving skill according to a result of the comparison.

Thus, according to the present invention, the driving skill of a vehicle operator can be accurately estimated in all road conditions, and the vehicle control system can be optimally controlled according to the estimated driving skill of the vehicle operator at all times.

The evaluation of the driving skill of the vehicle operator based on such data can be accomplished in a number of ways. For instance, such conventional algorithms and computer systems as those known under the name of neural network modeling techniques, fuzzy control and expert system can be used for such purpose.

The means for determining a reference trajectory may alternatively consist of means for determining a reference travel trajectory from data given from a preprogrammed map of a conventional global positioning system. Preferably, the estimation of the driving skill may take into account the road condition as it may affect the driving skill of the vehicle operator.

The present invention also provides a system for controlling a vehicle steering device according to an operating condition of a vehicle, comprising: means for detecting an operating condition of the vehicle; means for controlling the vehicle steering device according to data on the operating condition detected by the detecting means; means for estimating a driving skill of a vehicle operator according to an operation executed by the vehicle operator; and means for modifying a property of the controlling means according to the driving skill detected by the driving skill estimating means.

According to a preferred embodiment of the present invention, the operating condition includes a yaw movement of the vehicle, and a level of intervention of the control means on the steering device is decreased when the detected driving skill is relatively high. Thus, a skilled vehicle operator will benefit from brisk handling of the vehicle, and can maneuver the vehicle at will while an unskilled vehicle operator will benefit from stable handling of the vehicle, and will find the vehicle easier to handle and less tiring.

Preferably, the controlling means provides a drive signal for a powered actuator so as to cancel a deviation of an actual yaw rate from a reference yaw rate computed from data including a steering input and a vehicle speed. The powered actuator may steer either front wheels or rear wheels of the vehicle.

According to another preferred embodiment of the present invention, the controlling means provides a drive signal for a powered actuator of the steering device according to a dynamic condition of the vehicle, and the modifying means modifies a property of the control means so as to reduce a responsiveness of the actuator.

According to yet another embodiment of the present invention, the vehicle steering system comprises reaction producing means for applying a steering reaction to a steering wheel of the vehicle in dependence on a current yaw rate of the vehicle, and a magnitude of the steering reaction is smaller when the detected driving skill is relatively high.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
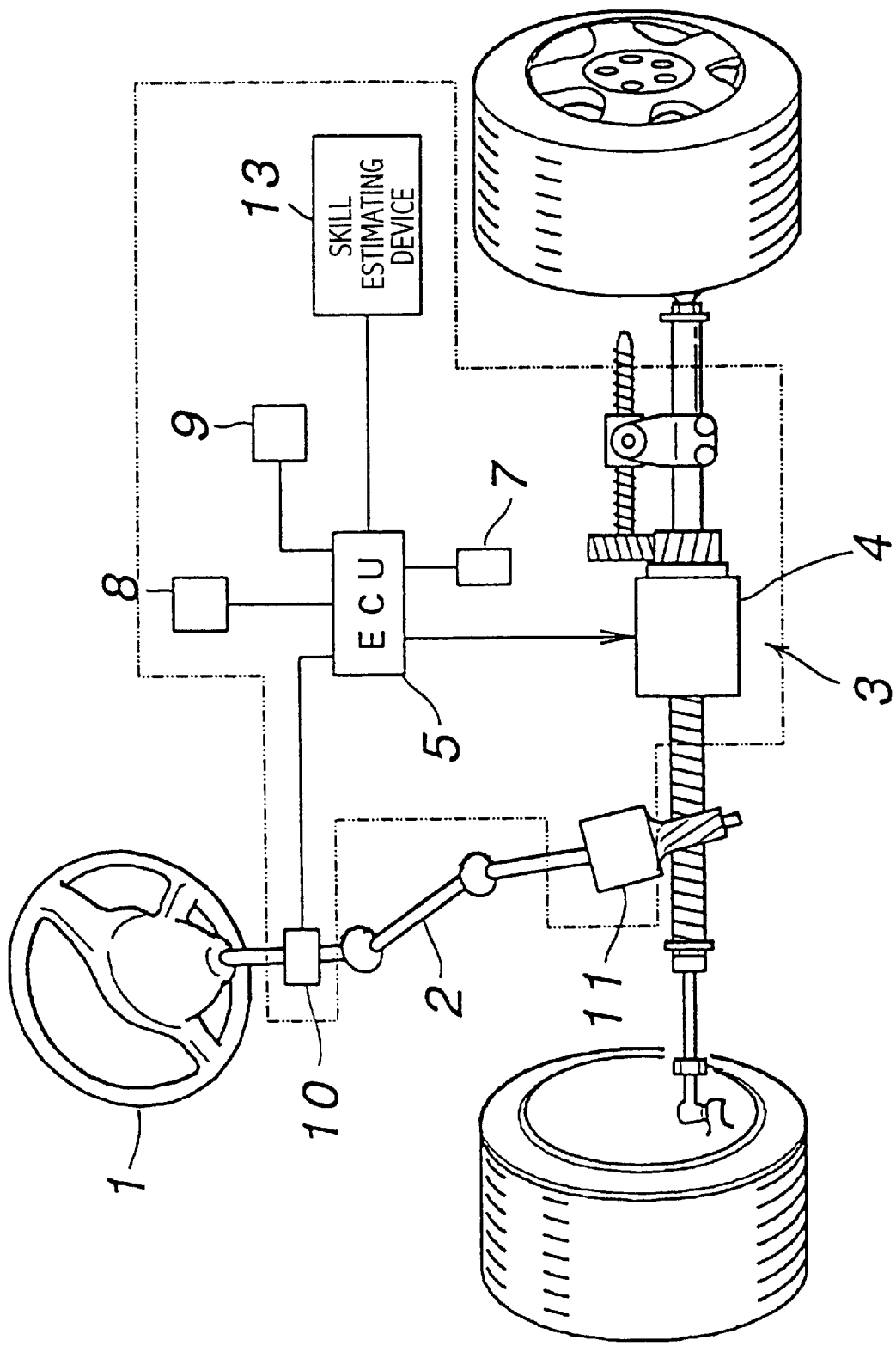
FIG. 1 is a schematic perspective view of a first embodiment of the present invention constructed as an electric power steering system.

FIG. 1 shows the overall structure of a first embodiment of the present invention constructed as an electric power steering system. A steering wheel 1 is connected to a rack and pinion steering device 3 via a steering shaft 2, and the steering device 3 is provided with a power assist device 4 using an electric motor to assist the steering input from the steering wheel 1. The power assist device 4 is controlled by an ECU 5 which is connected to a vehicle speed sensor 7, a yaw rate sensor 8, a lateral acceleration sensor 9, a steering sensor 10 consisting of a rotary encoder for detecting the steering angle, the steering angular speed and the steering angular acceleration of the steering wheel 1, and a torque sensor 11 for detecting the torque applied to the steering shaft 2. Additionally, the ECU 5 is connected to a driving skill estimating device 13 which estimates the driving skill of the vehicle operator as described hereinafter, and evaluates his skill according a scale of multiple levels, such as fine levels.

Figure 2:
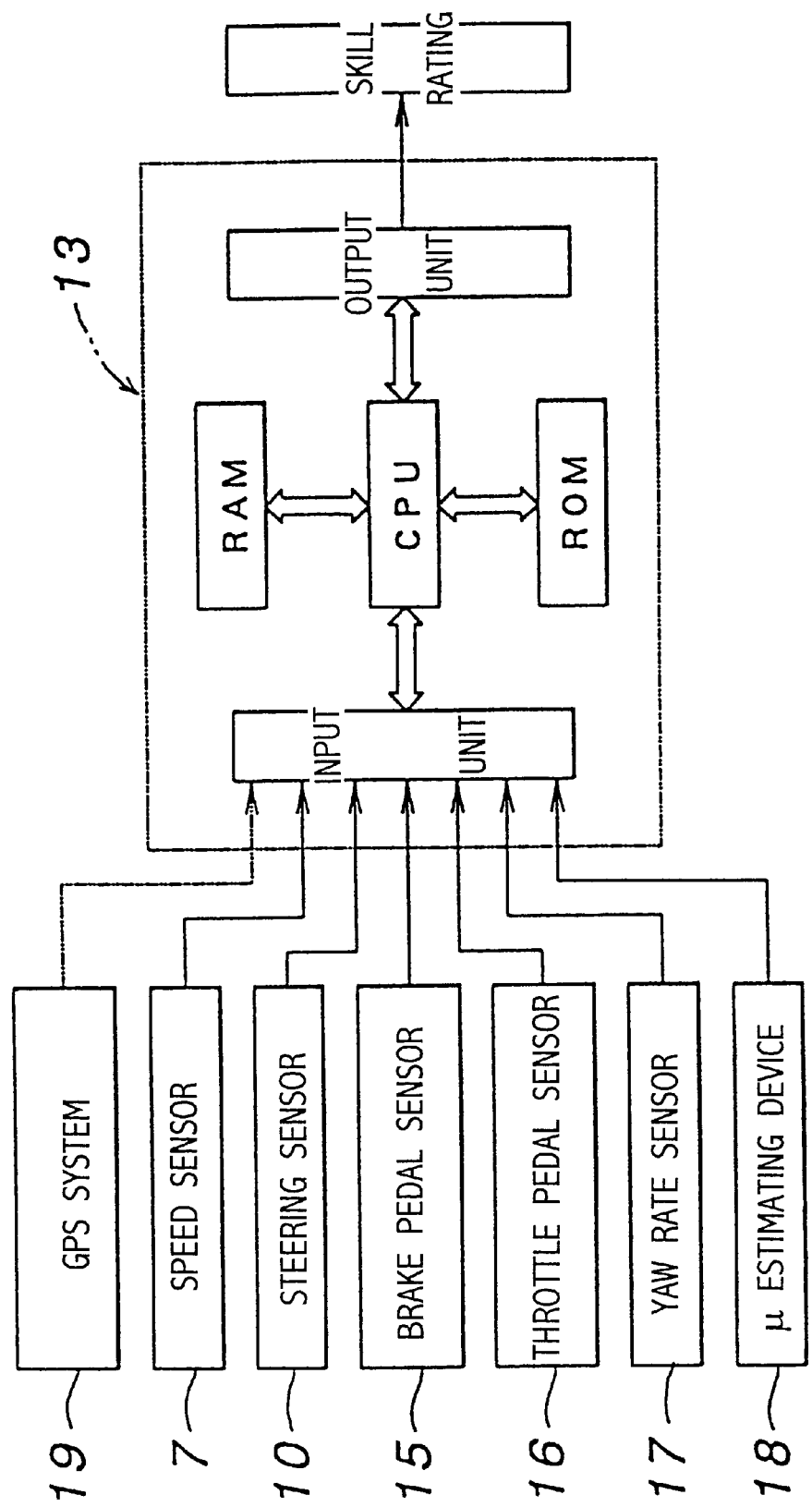
FIG. 2 is a block diagram of a driving skill estimating device according to the present invention.

Referring to FIG. 2, the driving skill estimating device 13 is internally provided with a CPU along with ROM, RAM, an input unit, and an output unit associated with the CPU. The input unit is connected to the vehicle speed sensor 7, the steering sensor 10, a brake pedal sensor 15 for detecting the stroke, the speed, and the force in stepping on the brake pedal, a throttle sensor 16 for detecting the stroke, and the speed in stepping on the accelerator pedal, a yaw rate sensor 17, and a $\mu$ estimating device 18 for estimating the frictional coefficient $\mu$ of the road surface to feed data from these sensors and devices to the CPU of the driving skill estimating device 13.

Figure 3:
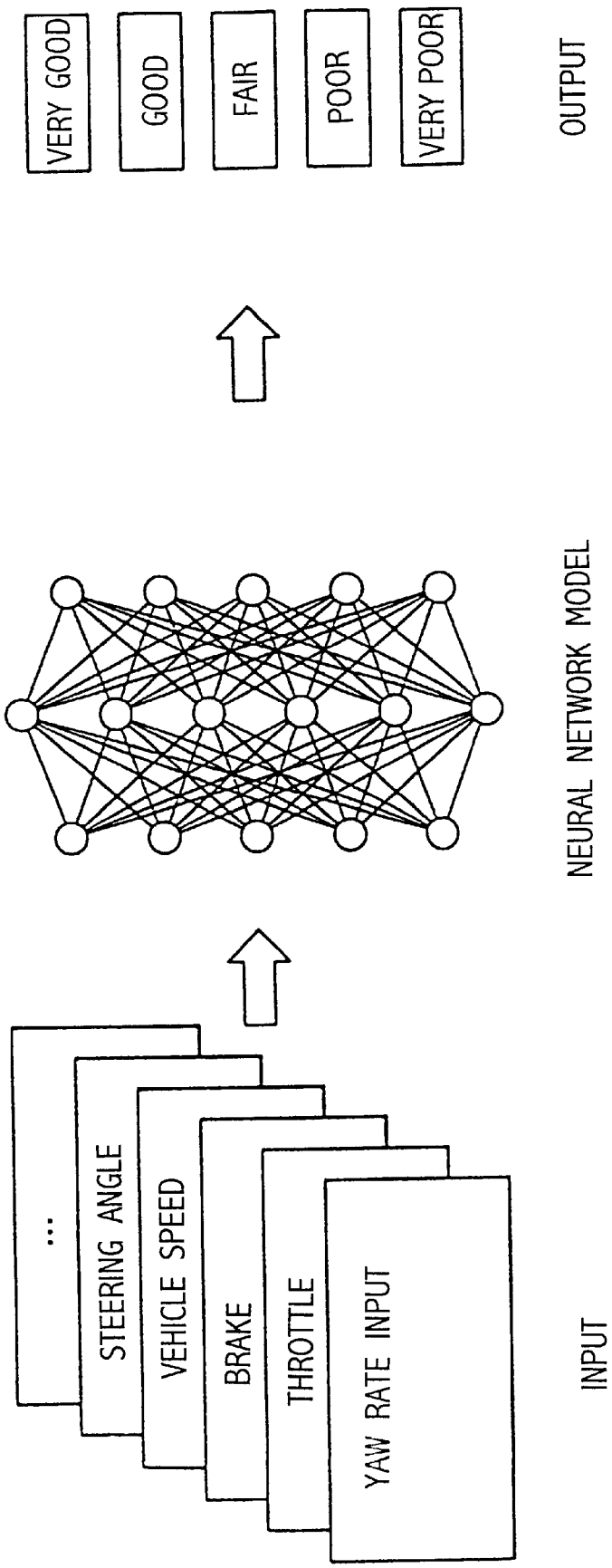
FIG. 3 is a diagram showing the principle of the driving skill estimating device.

The actual estimation of the driving skill of the vehicle operator is carried out by using a neural network as shown in FIG. 3, and his skill is evaluated by the scale of five levels according to the outputs from the sensors and the estimated frictional coefficient $\mu$ of the road surface. The neural network has a learning capability, and can accurately determine the driving skill in various conditions.

Figure 4:
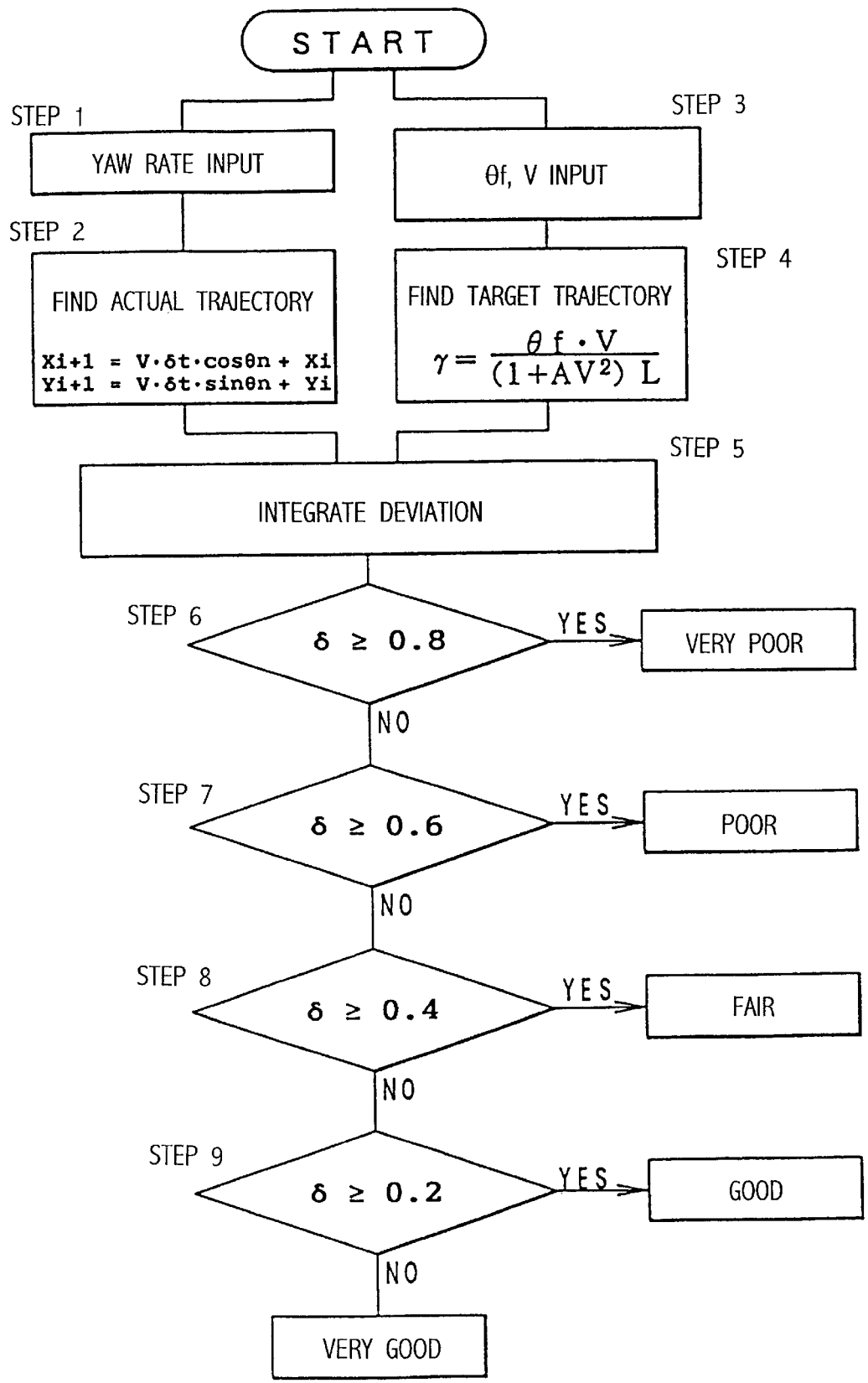
FIG. 4 is a flow chart showing the operation of the driving skill estimating device.
Figure 5:
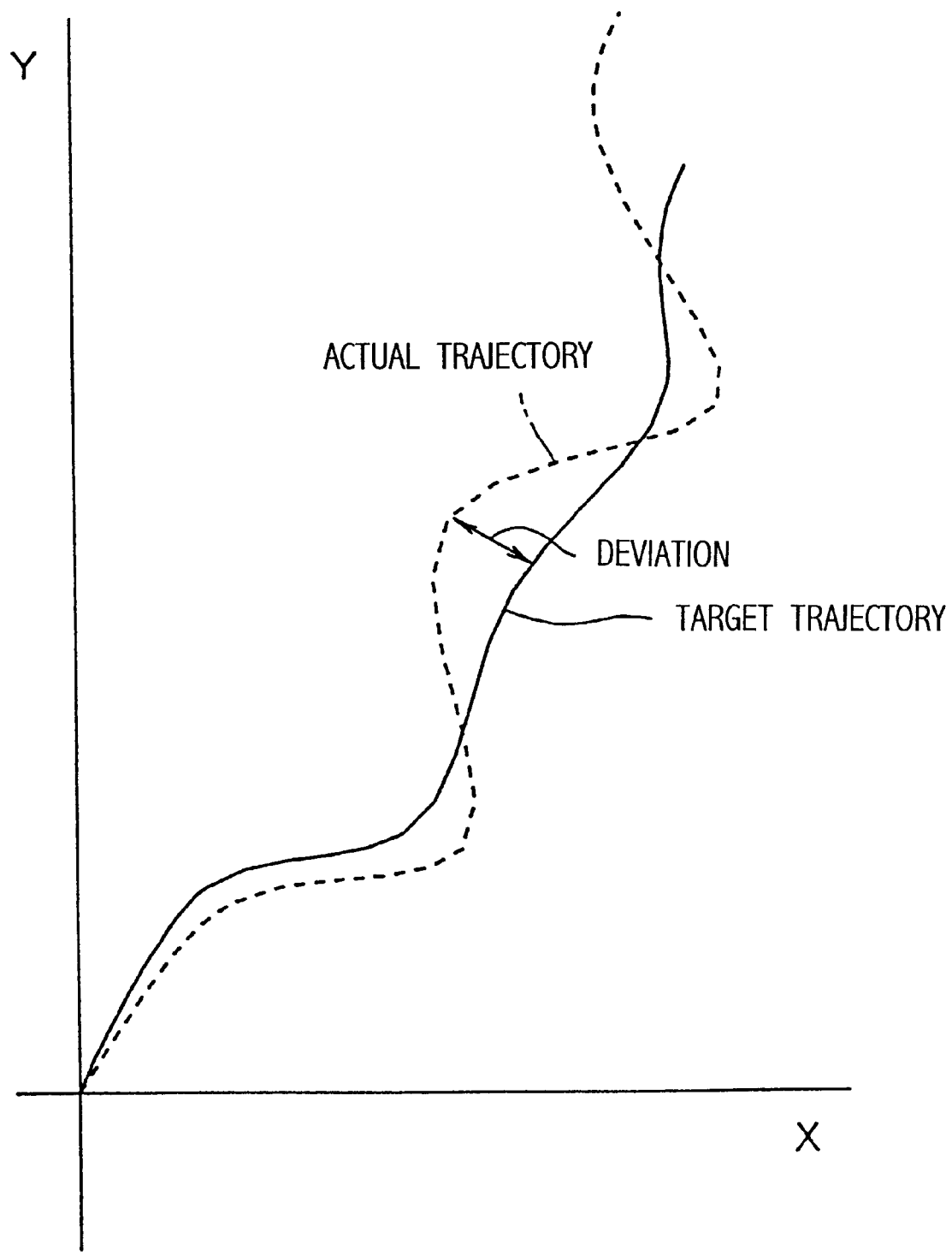
FIG. 5 is a graph showing the deviation of an actual trajectory of a vehicle from a target or reference trajectory.

The procedure for estimating the driving skill is described in the following with reference to the flow chart of FIG. 4. In steps 1 and 2, the yaw angle $\theta n$ of the vehicle is determined from the yaw rate detected at regular intervals by the yaw rate sensor 17, and the position (X, Y) of the vehicle is determined according to the following equations. The obtained positions are connected by a spline curve. A radius of curvature R of the spline curve is computed as an approximation of the radius of curvature of the trajectory of the vehicle, and the actual trajectory of the vehicle as shown by the broken line of FIG. 5 is obtained.

$$X_{i+1}=V \cdot \delta t \cdot cos\theta_n+X_i$$

$$Y_{i+1}=V \cdot \delta t \cdot sin\theta_n+Y_i$$

where $X_i$ and $Y_i$ are the coordinates of the vehicle at time point i, V is the vehicle speed, and $\delta t$ is the time increment.

At the same time, in steps 3 and 4, from the steering angle, the steering angular speed, the steering angular acceleration, the vehicle speed, the stepping stroke, the stepping speed, and the stepping force of the brake pedal, the stepping stroke, and the stepping speed of the accelerator pedal, and the estimated frictional coefficient $\mu$ of the road surface, a target trajectory as shown by the solid line in FIG. 5 is obtained according to the following equations.

$$\gamma=\theta_f V/(1+A \cdot V^2) \cdot L$$

$$A=\{(Lf \cdot Kf-Lr \cdot Kr)/Kf \cdot Kr\} \cdot (-M/2L^2)$$

where $\gamma$ is the yaw rate, $\theta_f$ is the front wheel steering angle, L is the wheel base (distance between the front and rear wheels) of the vehicle, Lf and Lr are the distances of the front wheels, and the rear wheels from the center of gravity of the vehicle, Kf and Kr are cornering powers of the front and rear wheels, respectively, and M is the moment of inertia of the vehicle. The term A is known as a stability factor.

If the vehicle operator is a skilled one, the deviation between the actual trajectory and the target trajectory is relatively small. In step 5, an integrated value $\delta$ of the deviation with respect to time is computed. In steps 6 through 9, the skill of the vehicle operator is evaluated and classified into one of the five levels, "very good", "good", "fair", "poor", and "very poor" according to the integrated value $\delta$ of the deviation.

In this embodiment, the target vehicle trajectory was obtained from the steering angle, the steering angular speed, and the steering angular acceleration of the steering wheel, the vehicle speed, the stepping stroke, the stepping speed, and the stepping force of the brake pedal, the stepping stroke, and the stepping speed of the accelerator pedal, and the estimated frictional coefficient $\mu$ of the road surface, but it is also possible to obtain a target vehicle trajectory according to data obtained from a navigation system which makes use of a satellite global positioning system and/or a yaw rate gyro sensor as indicated by numeral 19 in FIG. 2.

Figure 6:
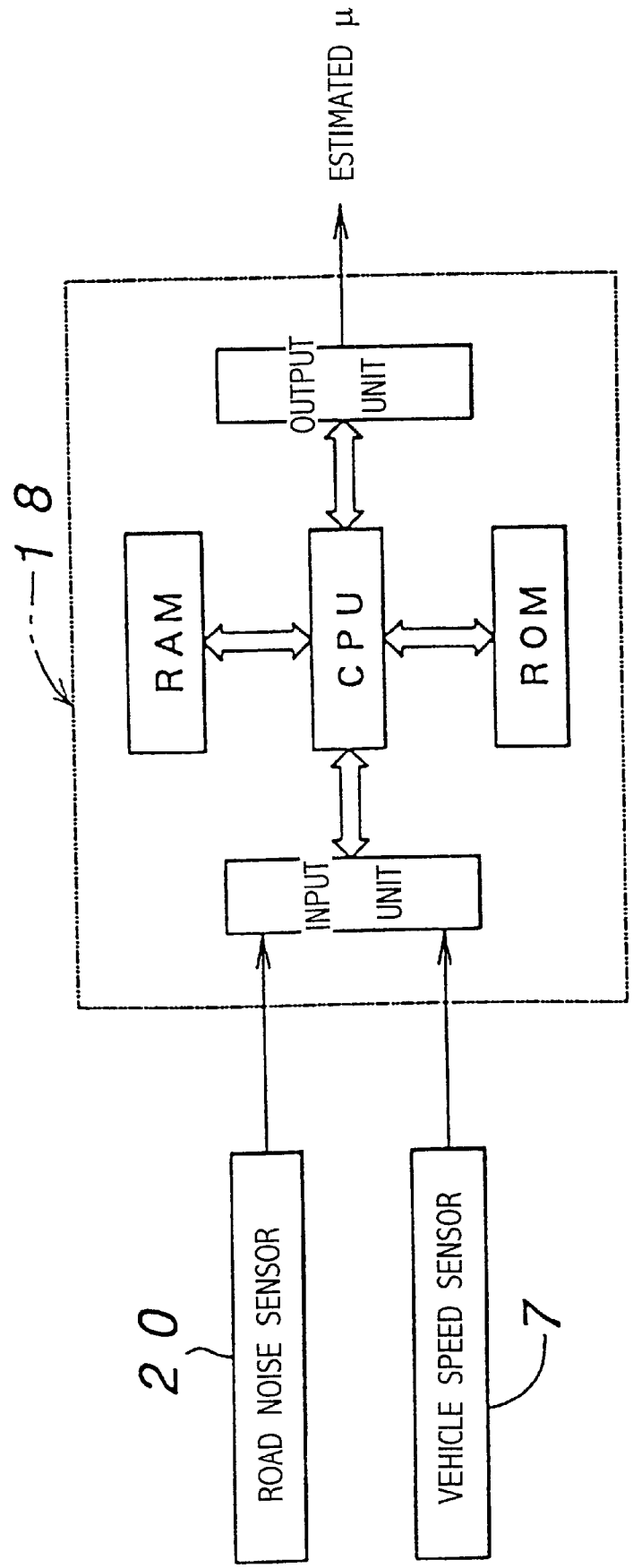
FIG. 6 is a block diagram of a $\mu$ estimating device.

As shown in FIG. 6, the $\mu$ estimating device 18 is internally provided with a CPU along with ROM, RAM, an input unit, and an output unit associated with the CPU. The input unit is connected to the vehicle speed sensor 7 and a road noise sensor 20, and feeds the data obtained from them to the CPU.

Figure 7:
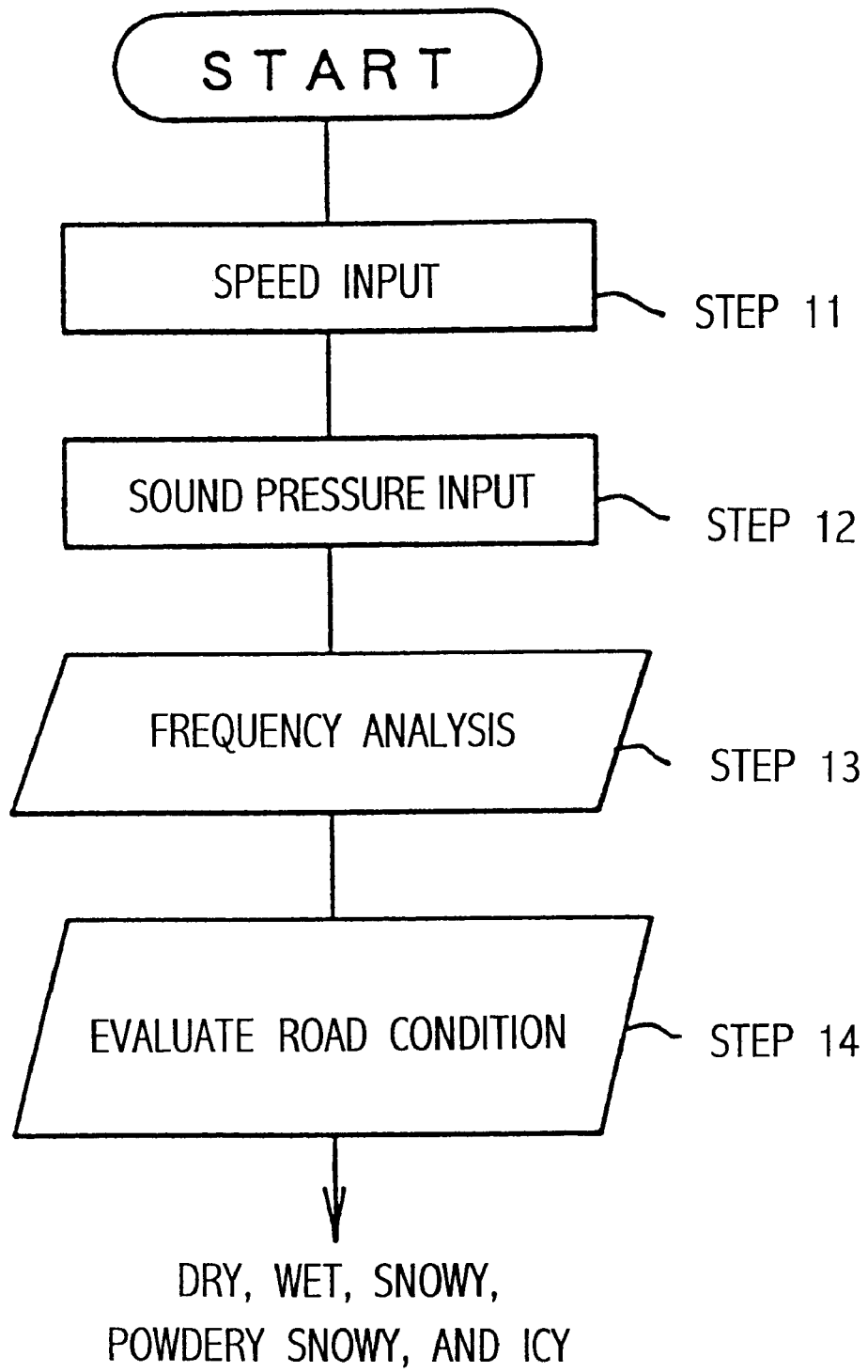
FIG. 7 is a flow chart showing the procedure for estimating $\mu$.

The actual estimation of the frictional coefficient $\mu$ is carried out by using a neural network as shown in FIG. 3, and is evaluated by the scale of five levels according to the outputs from the sensors. The procedure for estimating the frictional coefficient $\mu$ is now described with reference to the flow chart of FIG. 7. First of all, in steps 11 and 12 the vehicle speed and the sound pressure signal are obtained from the corresponding sensors, and in steps 13 and 14 the road condition is evaluated by the neural network according to the scale of five levels, "dry", "wet", "snowy", "powdery snowy" and "icy".

Figure 8:
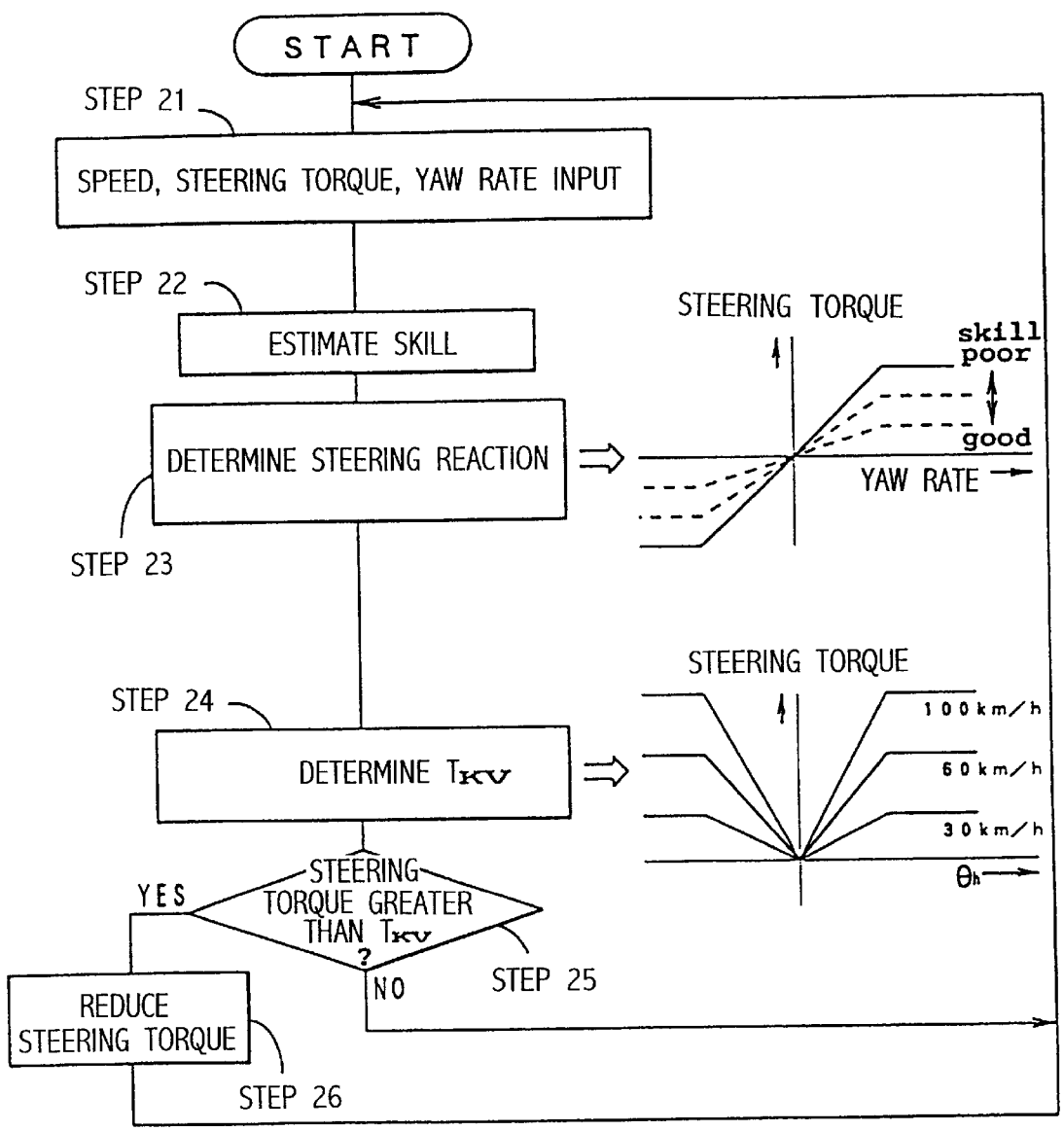
FIG. 8 is a flow chart showing the procedure for producing a steering reaction.

The ECU 5 provides, in addition to the normal power assist control, a steering reaction control to apply a certain reaction to the steering effort applied by the vehicle operator according to the control flow represented by the flow chart of FIG. 8. Thus, the power assist control reduces the effort required in steering the vehicle in a low speed range, and the steering reaction control provides a suitable amount of reaction which prevents the vehicle operator from making excessive steering input so that the yaw movement of the vehicle may be appropriately controlled, and the lateral stability of the vehicle may be improved.

More specifically, the vehicle speed, the steering load (more precisely, the load encountered by the rack) and the yaw rate are read in step 21, and the driving skill is estimated in step 22. The power assist device 4 is controlled, and the steering reaction torque is appropriately determined according to the detected yaw rate and the driving skill of the vehicle operator in step 23.

As shown in the graph given next to step 23 of FIG. 8, the steering reaction torque is controlled for a given yaw rate or the gain is reduced if the vehicle operator is skilled, but the steering reaction torque is increased for a given yaw rate or the gain is increased if the vehicle operator is not skilled. Thus, information is more directly transmitted to the vehicle operator if he is skilled, and he can positively control the turning behavior of the vehicle so as to briskly maneuver the vehicle. Conversely, if the vehicle operator is not skilled, the control system produces a reaction which prevents the vehicle operator from over-reacting to the vehicle response, and stabilizes the vehicle.

In step 24, a steering load property value $T_{KV}$ is determined from the steering angle $\theta_h$ and the vehicle speed V according to a pre-programmed graph or table as a reference steering torque value, as shown in the graph next to step 24. In step 25, the steering torque value determined in step 23 is compared with $T_{KV}$. The program flow advances to step 26 to reduce the steering torque (increase the power assist) if the steering torque value is greater than $T_{KV}$, and otherwise returns to step 21 to repeat the same procedure.

Figure 9:
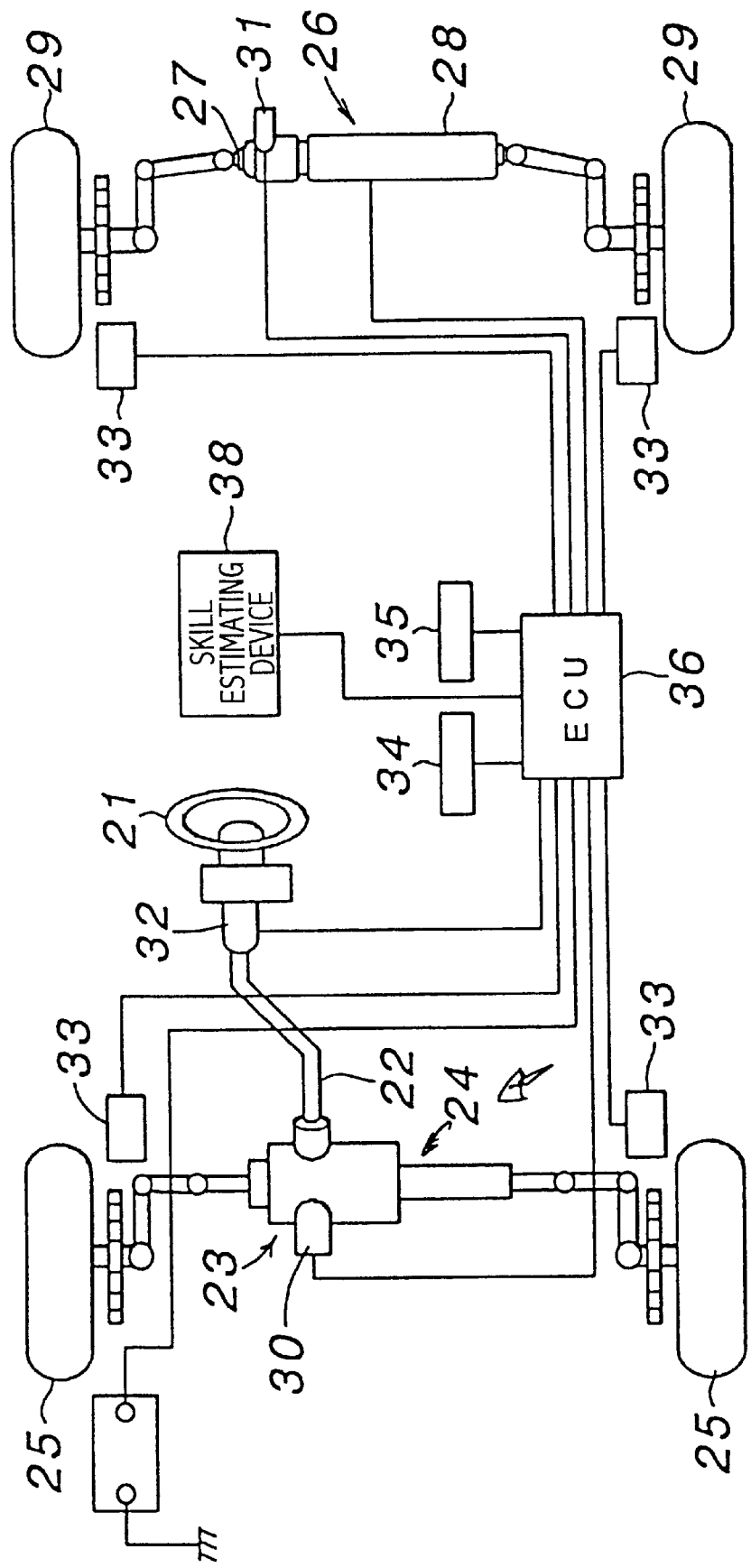
FIG. 9 is a schematic perspective view of a second embodiment of the present invention constructed as an active four-wheel steering system.

FIG. 9 is a block diagram of a second embodiment of the present invention constructed as an active four-wheel steering system.

A steering wheel 21 is secured to an upper end of a steering shaft 22 which is mechanically connected to a steering rod 24 of a front wheel steering device 23 extending laterally. The two ends of the steering rod 24 are connected, via tie rods, to corresponding knuckle arms supporting front wheels 25. A rear wheel steering device 26 is mounted in a rear part of the vehicle, and comprises a steering rod 27 extending laterally and adapted to be actuated by an electric motor 28. The two ends of the steering rod 27 are likewise connected, via tie rods, to corresponding knuckle arms supporting rear wheels 29.

Each of the front and rear wheel steering devices 23 and 26 are provided with a steering angle sensor 30 or 31 for measuring the steering angle of the front wheels or the rear wheels as the case may be. The steering shaft 22 is provided with a steering angle sensor 32. The wheels 25 and 29 are each provided with a vehicle speed sensor 33, and a lateral acceleration sensor 34 and a yaw rate sensor 35 are mounted on suitable parts of the vehicle body. These sensors 30 through 35 are electrically connected to an ECU 36 for controlling the electric motor 28.

The ECU 36 is also connected to a driving skill estimating device 38 similar to the corresponding device of the first embodiment.

Figure 10:
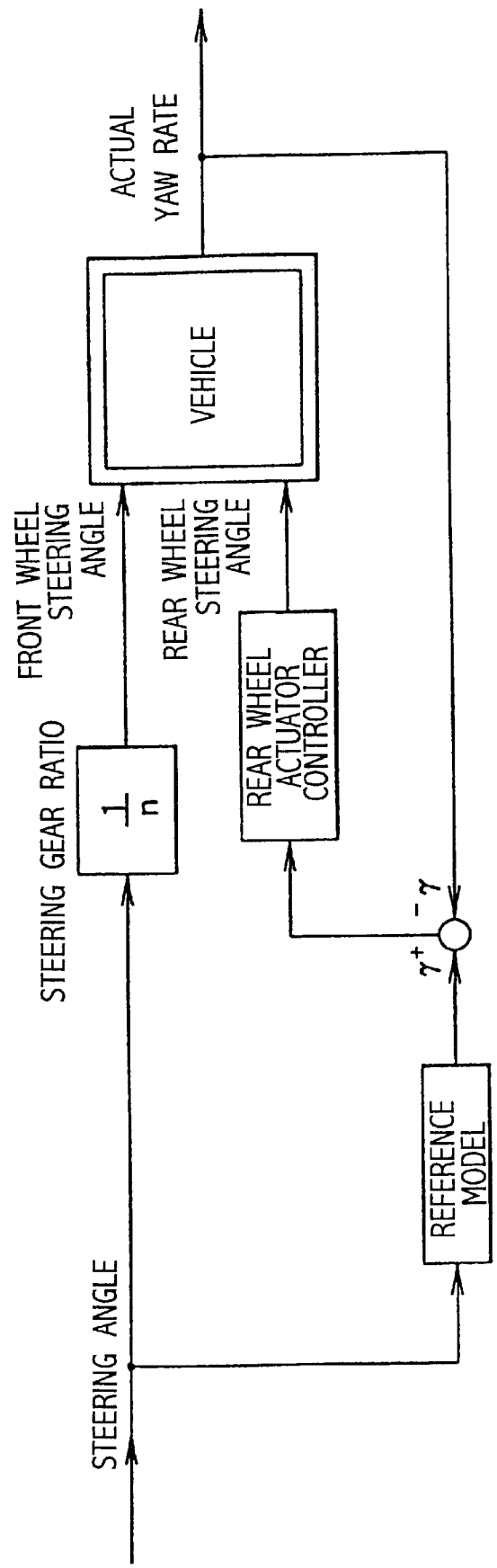
FIG. 10 is a block diagram of a control device for the active four-wheel steering system shown in FIG. 9.
Figure 11:
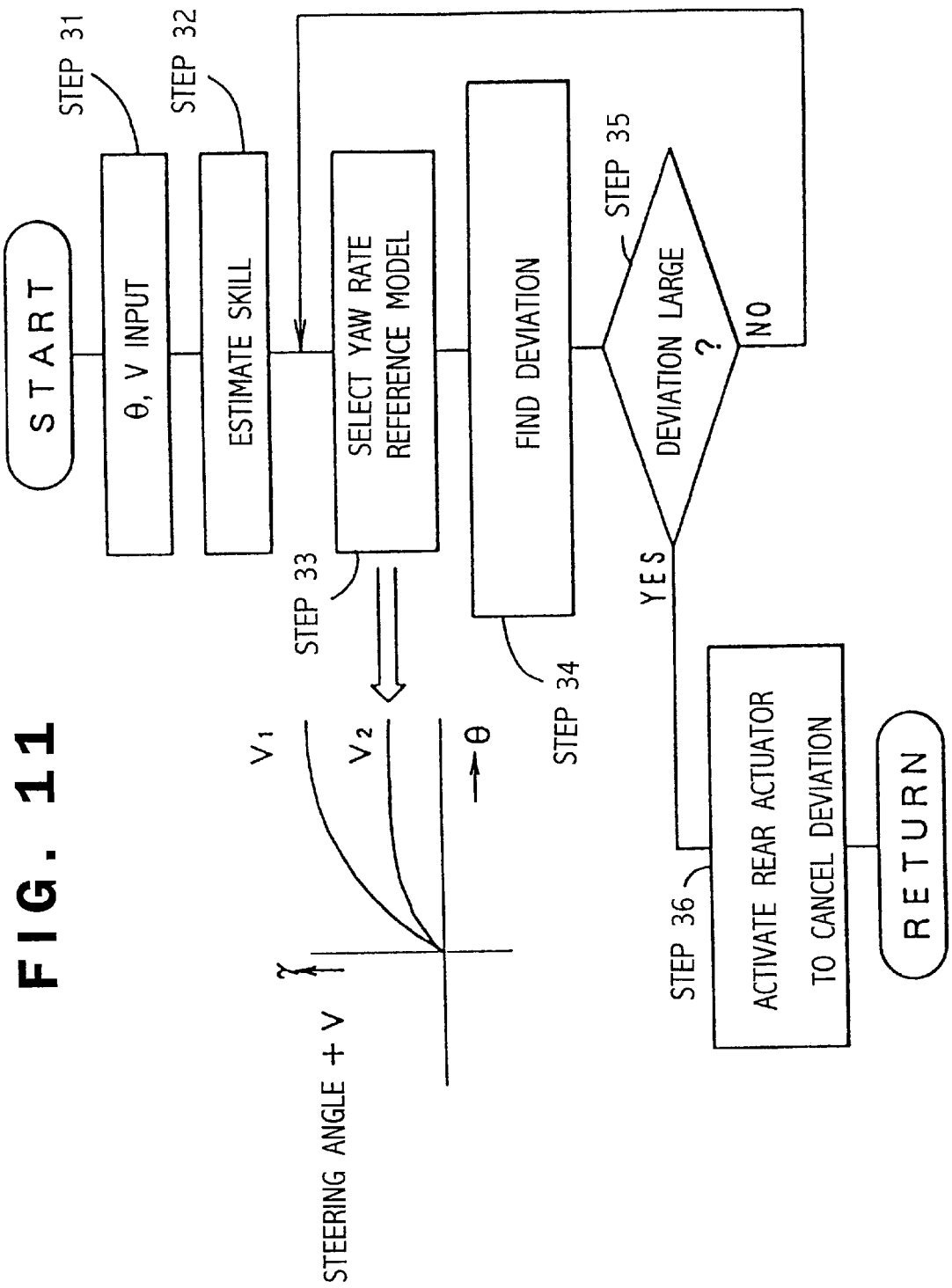
FIG. 11 is a flow chart showing the control flow of the active four-wheel steering system shown in FIG. 9.
Figure 12:
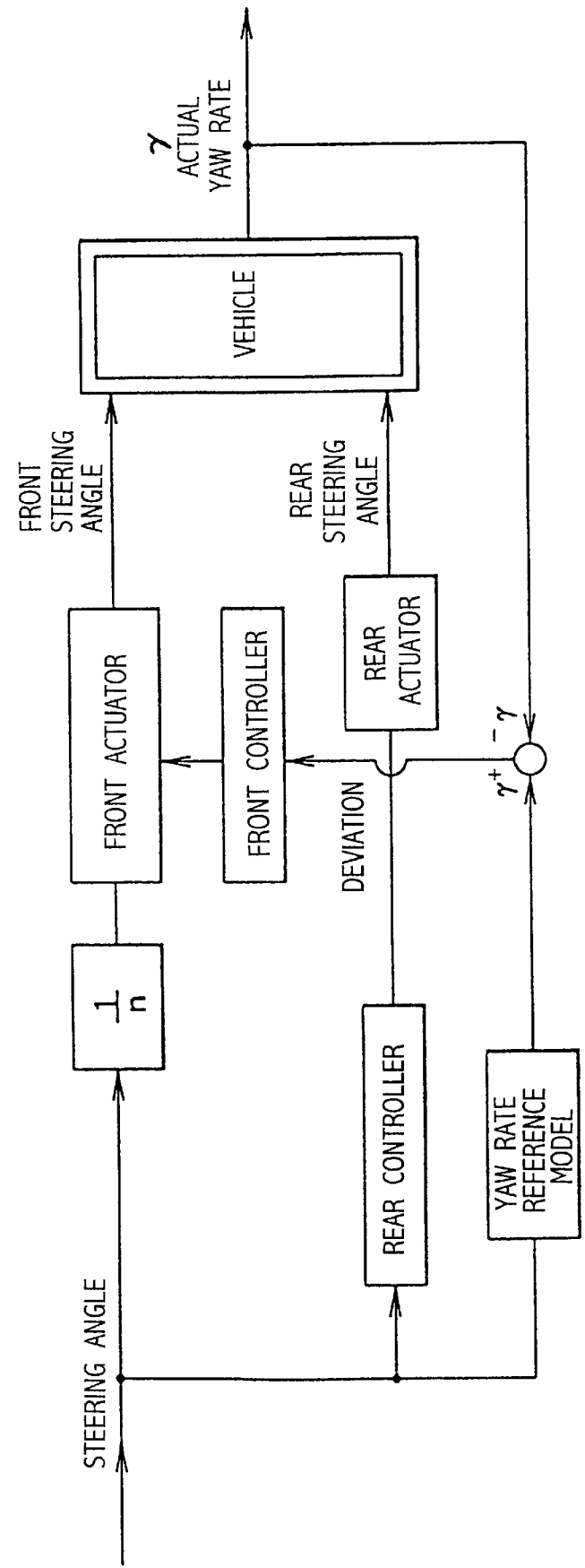
FIG. 12 is a block diagram of a control device for a third embodiment of the present invention constructed as a semi-active four-wheel steering system.
Figure 13:
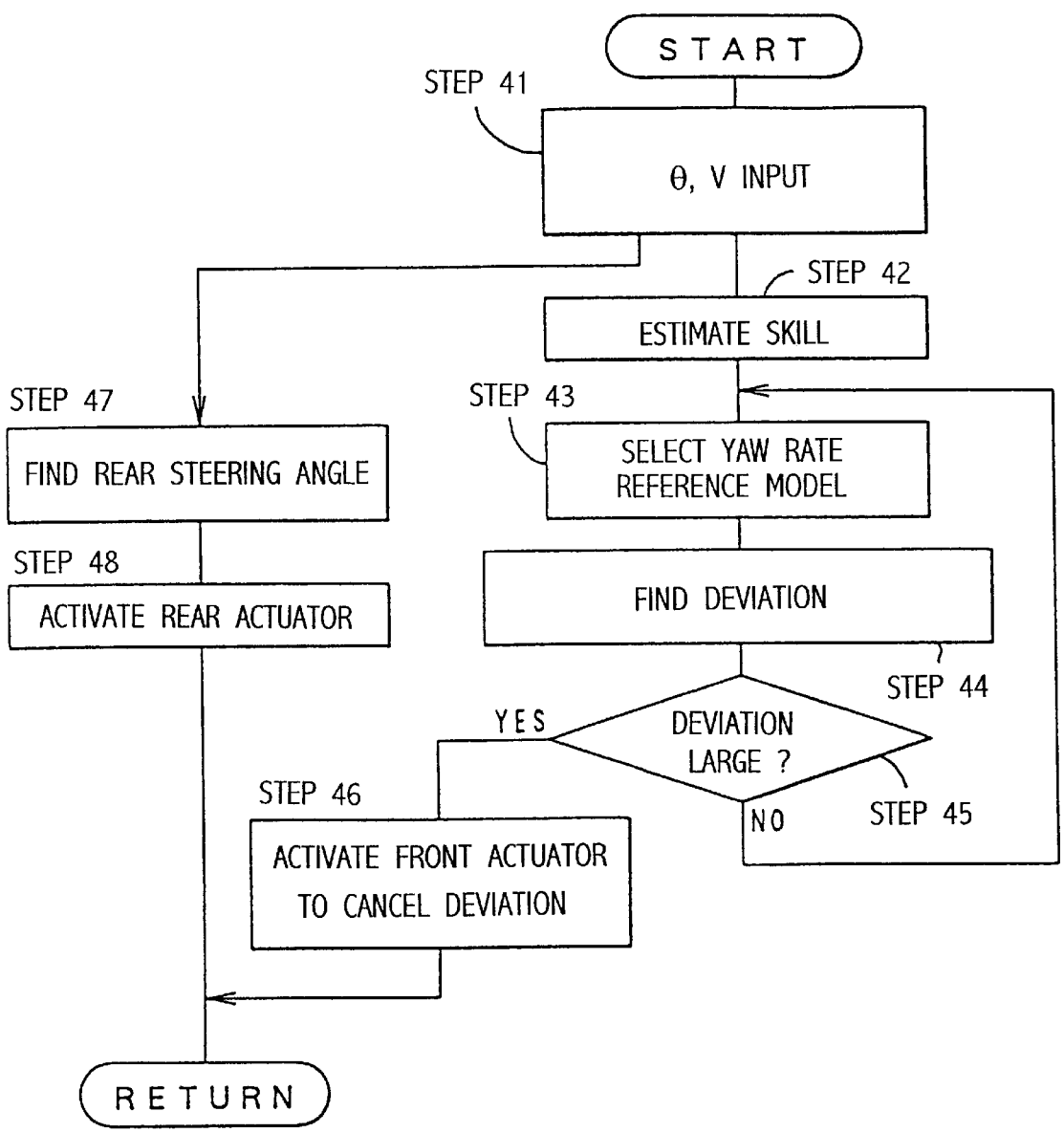
FIG. 13 is a flow chart showing the control flow of the semi-active four-wheel steering system shown in FIG. 12.

According to this four wheel steering system, when the steering wheel 21 is turned by a vehicle operator, the steering rod 24 of the front wheel steering device 23 is mechanically actuated, and the front wheels 25 are steered. At the same time, the steering angle of the steering wheel 21 and the displacement of the steering rod 24 are supplied to the ECU 36 via the corresponding sensors 30 and 32. Based on the steering angle of the front wheels 25, the vehicle speed, the yaw rate and the estimated driving skill of the vehicle operator, the ECU 36 determines the optimum steering angle of the rear wheels 29, and drives the electric motor 26 accordingly.FIG. 10 is a block diagram of the control device of this active four-wheel steering system, and FIG. 11 is a flow chart showing the control flow of this system.First of all, the vehicle speed V, the steering angle θ and other data are supplied to the ECU 36 in step 31, and the driving skill of the vehicle operator is estimated in step 32 in a manner similar to the first embodiment. A yaw rate reference model is obtained from the graph given next to step 33 of FIG. 11 according to the estimated driving skill of the vehicle operator in step 33, and the deviation of the actual yaw rate from the reference model yaw rate is obtained in step 34. If the deviation exists or exceeds a certain threshold value (step 35), the program flow advances to step 36, and the optimum steering angle for the rear wheels is determined and the electric motor 28 is actuated so that this deviation may be cancelled in a manner corresponding to the estimated skill of the vehicle operator.In this case, if the vehicle operator's driving skill is relatively high, the steering angle of the rear wheels for a given deviation in the yaw rate is controlled. Conversely, if the vehicle operator's driving skill is relatively low, the steering angle of the rear wheels for a given deviation in the yaw rate is increased. Thus, for a skilled vehicle operator who is fully aware of the dynamic conditions and the expected response of the vehicle, the steering angle of the rear wheels based on the magnitude of the yaw rate is controlled in such a manner that the vehicle operator has a better control over the vehicle with reduced intervention by the steering control system. Conversely, for an unskilled vehicle operator, the rear wheels are more positively steered by the steering control system to stabilize the turning behavior of the vehicle.FIG. 12 is a block diagram of the control device of a third embodiment of the present invention constructed as a semi-active steering device, and FIG. 13 is a flow chart showing the control procedure. According to this steering system, the steering wheel and the steerable wheels are not mechanically coupled with each other, and the steerable wheels are steered by a powered actuator according to an output from an ECU which receives sensor signals indicating the steering angle of the steering wheel, the vehicle speed, the yaw rate and other data. In this embodiment, the front wheels and the rear wheels are both steered.According to this system, when the vehicle operator turns the steering wheel, the ECU determines the optimum steering angle of the front wheels according to the steering angle of the steering wheel, the current steering angles of the front and rear wheels, the vehicle speed, the yaw rate and the estimated driving skill of the vehicle operator, and drives the electric motor accordingly.More specifically, the vehicle speed, the steering angle and other data are supplied to the ECU in step 41, and the driving skill of the vehicle operator is estimated in step 42 in a manner similar to the first and second embodiments. A reference yaw rate model based on the estimated driving skill of the vehicle operator is obtained in step 43 in a manner similar to the second embodiment. The deviation of the actual yaw rate from the reference model yaw rate is obtained in step 44. If the deviation is greater than a prescribed threshold value (step 45), the program flow advances to step 46 to determine the optimum steering angle of the front wheels so as to cancel the deviation according to the estimated driving skill of the vehicle operator, and actually steers the front wheels accordingly.In step 47, a pattern of the steering angle of the rear wheels is programmed from the vehicle speed, the steering angle and other data supplied in step 41. The rear wheels are actually steered according to this program in step 48.If the vehicle operator has a relatively high driving skill, the gain for the steering angle of the front wheels for a given deviation is increased, or the vehicle is made more responsive. The gain is reduced if the vehicle operator has a relatively low driving skill. Thus, for a skilled vehicle operator, he can maneuver the vehicle at will, and can briskly handle the vehicle. For an unskilled vehicle operator, the vehicle is less sensitive to steering input, and is therefore less tiring for the vehicle operator.According to the present invention, the control property of the vehicle control system is varied according to the estimated driving skill of the vehicle operator, and the handling of the vehicle can be adapted to the driving skill of the vehicle operator. A skilled vehicle operator will benefit from brisk handling of the vehicle, and can maneuver the vehicle at will while an unskilled vehicle operator will benefit from stable handling of the vehicle, and will find the vehicle easier to handle and less tiring. Although the present invention has been described in terms of specific embodiments thereof, it is possible to modify and alter details thereof without departing from the spirit of the present invention.

What we claim is: 1. A system for controlling a vehicle steering device according to an operating condition of a vehicle, comprising:

means for detecting an operating condition of said vehicle;

means for controlling said vehicle steering device according to data on said operating condition detected by said detecting means;

means for estimating a driving skill of a vehicle operator according to an operation executed by said vehicle operator;

means for modifying a property of said controlling means according to said driving skill estimated by said driving skill estimating means;

said operating condition includes at least one of a yaw movement and a lateral acceleration of said vehicle; and a level of intervention of said control means on said steering device is decreased when said estimated driving skill is relatively high; and said controlling means provides a drive signal for a powered actuator so as to cancel a deviation of an actual yaw rate of the vehicle from a reference yaw rate computed from data including a steering input and a vehicle speed.2. A control system according to claim 1, wherein said powered actuator steers front wheels of said vehicle.3. A control system according to claim 1, wherein said powered actuator steers rear wheels of said vehicle.4. A system for controlling a vehicle steering device according to an operating condition of a vehicle, comprising:

means for detecting an operating condition of said vehicle;

means for controlling said vehicle steering device according to data on said operating condition detected by said detecting means;

means for estimating a driving skill of a vehicle operator according to an operation executed by said vehicle operator;

means for modifying a property of said controlling means according to said driving skill estimated by said driving skill estimating means;

said operating condition includes at least one of a yaw movement and a lateral acceleration of said vehicle; and a level of intervention of said control means on said steering device is decreased when said estimated driving skill is relatively high; and said controlling means provides a drive signal for a powered actuator of said steering device according to a dynamic condition of said vehicle, and said modifying means modifies a property of said controlling means so as to reduce a responsiveness of said actuator.

5. A system for controlling a vehicle steering device according to an operating condition of a vehicle, comprising:

means for detecting an operating condition of said vehicle;

means for controlling said vehicle steering device according to data on said operating condition detected by said detecting means;

means for estimating a driving skill of a vehicle operator according to an operation executed by said vehicle operator;

means for modifying a property of said controlling means according to said driving skill estimated by said driving skill estimating means;

said operating condition includes at least one of a yaw movement and a lateral acceleration of said vehicle;

a level of intervention of said control means on said steering device is decreased when said estimated driving skill is relatively high; and said vehicle steering system comprises reaction producing means for applying a steering reaction to a steering wheel of said vehicle in dependence on a current yaw rate of said vehicle, and a magnitude of said reaction is smaller when said estimated driving skill is relatively high.

6. A system for estimating a driving skill of a vehicle operator according to an operation executed by said vehicle operator, comprising:

means for determining an actual travel trajectory of a vehicle;

means for determining a reference travel trajectory according to an operation executed by said vehicle operator;

means for integrating a deviation between said reference trajectory and said actual trajectory; and means for comparing a value produced by said integrating means with a prescribed reference value, and evaluating said driving skill according to a result of said comparison.

7. A system for estimating a driving skill of a vehicle operator according to an operation executed by said vehicle operator, comprising:

means for determining an actual travel trajectory of a vehicle;

means for determining a reference travel trajectory from data given from a preprogrammed map of a global positioning system;

means for integrating a deviation between said reference trajectory and said actual trajectory; and means for comparing a value produced by said integrating means with a prescribed reference value, and evaluating said driving skill according to a result of said comparison.

8. A driving skill estimating system according to claim 6, further comprising means for estimating a road condition, said estimating means being adjusted by said road condition estimated by said road condition estimating means.

9. A system for controlling a vehicle steering device according to an operating condition of a vehicle, comprising:

means for detecting an operating condition of said vehicle;

means for controlling said vehicle steering device according to data on said operating condition detected by said detecting means;

means for estimating a driving skill of a vehicle operator according to an operation executed by said vehicle operator;

means for modifying a property of said controlling means according to said driving skill estimated by said driving skill estimating means;

said operating condition includes at least one of a yaw movement and a lateral acceleration of said vehicle;

a level of intervention of said control means on said steering device is decreased when said estimated driving skill is relatively high; and said driving skill estimating means comprises:

means for determining an actual travel trajectory of the vehicle;

means for determining a reference travel trajectory according to the operation executed by said vehicle operator;

means for integrating a deviation between said reference trajectory and said actual trajectory; and means for comparing a value produced by said integrating means with a prescribed reference value, and evaluating said driving skill according to a result of said comparison.

10. A system for controlling a vehicle steering device according to an operating condition of a vehicle, comprising:

means for detecting an operating condition of said vehicle;

means for controlling said vehicle steering device according to data on said operating condition detected by said detecting means;

means for estimating a driving skill of a vehicle operator according to an operation executed by said vehicle operator;

means for modifying a property of said controlling means according to said driving skill estimated by said driving skill estimating means;

said operating condition includes at least one of a yaw movement and a lateral acceleration of said vehicle;

a level of intervention of said control means on said steering device is decreased when said estimated driving skill is relatively high; and said driving skill estimating means comprises:

means for determining an actual travel trajectory of a vehicle;

means for determining a reference travel trajectory from data given from a preprogrammed map of a global positioning system;

means for integrating a deviation between said reference trajectory and said actual trajectory; and means for comparing a value produced by said integrating means with a prescribed reference value, and evaluating said driving skill according to a result of said comparison.

* * * * *

UNITED STATES PATENT AND TRADEMARK OFFICE
CERTIFICATE OF CORRECTION

PATENT NO : 5,991,675
DATED : 23 November 1999
INVENTOR(S): Nobuyoshi Asanuma

It is certified that error appears in the above-identified patent and that said Letters Patent is hereby corrected as shown below:

On the cover page, in the "[57] ABSTRACT", 4th line, change "a ideal" to --an ideal--.

Column 2, 18th line, change "angler" to --angle--;
line 29, after "vehicle" insert --operator--;
line 67, change "name" to --names--.

Column 4, line numbered between 35 and 36, after "according" insert --to--; change "fine" to --five--.

Column 5, first line, change "$X_{i+1}$" to --$X_{i+1}$--;
second line, change "$Y_{i+1}$" to --$Y_{i+1}$--;
line numbered 5, change "67t" to --$\delta t$--.

Column 7, line 4, begin a new paragraph with "FIG. 10";
7th line, begin a new paragraph with "First";
line numbered between 18 and 19, begin a new paragraph with "In this case,";
line 32, begin a new paragraph with "FIG.";
line numbered between 42 and 43, begin a new paragraph with "According";
line numbered 49, begin a new paragraph with "More";
line 61, begin a new paragraph with "In step 47";
line 65, begin a new paragraph with "If the".

Column 8, 7th line, begin a new paragraph with "According";
line numbered 14 (15th line), begin a new paragraph with "Although";
line 19, begin a new paragraph with "1. A system";
line numbered between 42 and 43, begin a new paragraph with "2. A control";
line 44, begin a new paragraph with "3. A control";
line 46, begin a new paragraph with "4. A system".

UNITED STATES PATENT AND TRADEMARK OFFICE
CERTIFICATE OF CORRECTION

PATENT NO : 5,991,675
DATED : 23 November 1999
INVENTOR(S): Nobuyoshi Asanuma

It is certified that error appears in the above-identified patent and that said Letters Patent is hereby corrected as shown below:

Column 9, line 3, begin a new paragraph with "5.  A";
line 27, begin a new paragraph with "6. A system";
line 40, begin a new paragraph with "7. A system";
line numbered between 53 and 54, begin a new paragraph with "8. A driving";
line 57, begin a new paragraph with "9. A system".

Column 10, line 28, begin a new paragraph with "10. A system".

Signed and Sealed this

Thirteenth Day of March, 2001

Attest:

NICHOLAS P. GODICI

Attesting Officer

Acting Director of the United States Patent and Trademark Office